UNITED STATES PATENT OFFICE.

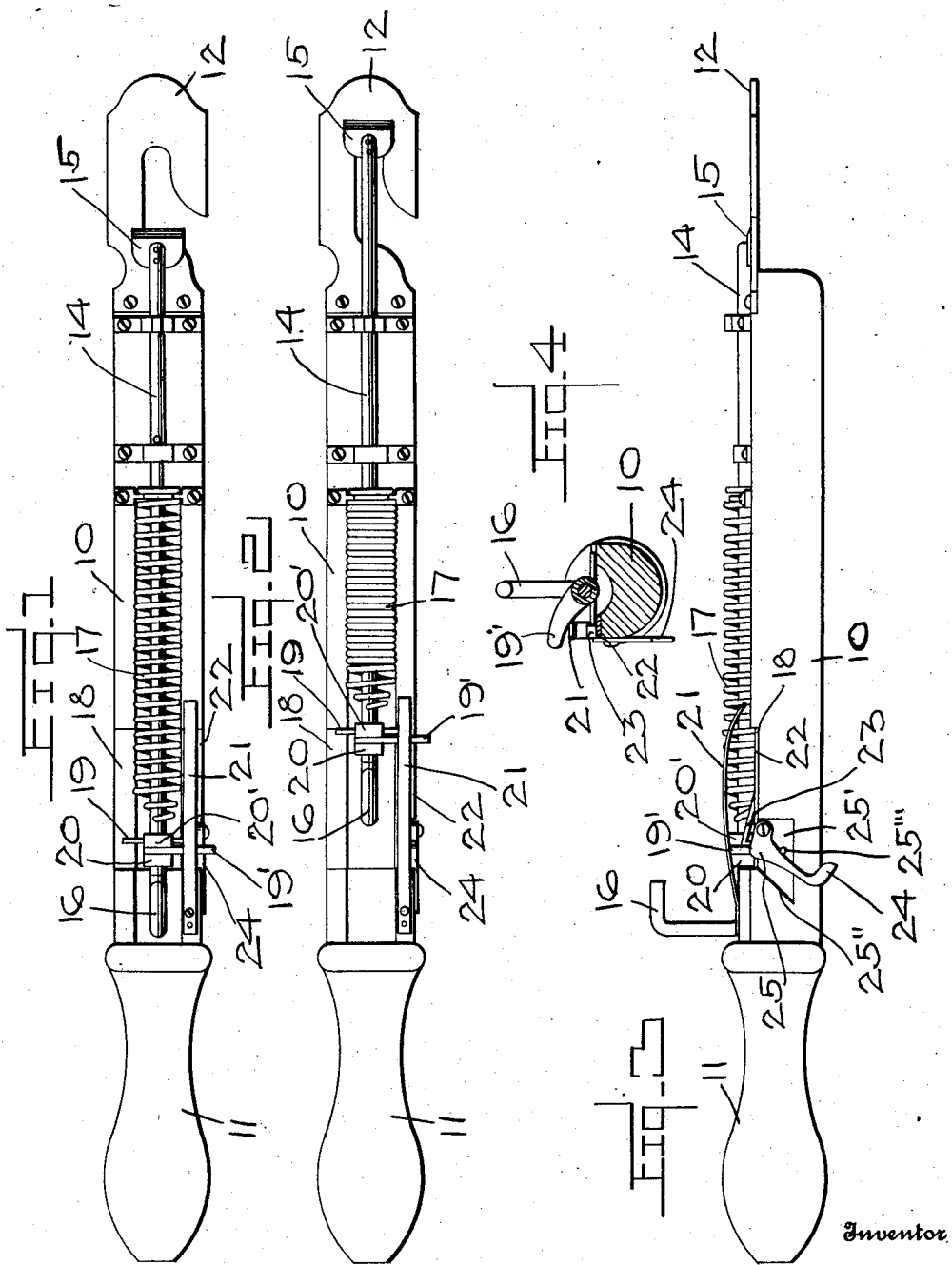

GEORGE A. STRONG, OF POLYTECHNIC, TEXAS.

TREE-TRIMMER.

1,010,817. Specification of Letters Patent. Patented Dec. 5, 1911.

Application filed January 25, 1911. Serial No. 604,583.

*To all whom it may concern:*

Be it known that I, GEORGE A. STRONG, a citizen of the United States, residing at Polytechnic, in the county of Tarrant and State of Texas, have invented certain new and useful Improvements in Tree-Trimmers, of which the following is a specification.

This invention relates to an improvement in pruning instruments, the object of said invention being to provide a device of this character which will be simple in construction and convenient to manipulate.

Other objects and advantages will be apparent from the following description, and it will be understood that changes in the specific structure shown and described may be made within the scope of the claims without departing from the spirit of the invention.

In the drawings: Figure 1 is a view of the device in its cocked position, Fig. 2 is a view with the cutting member at the limit of its stop, Fig. 3 is an edge view showing the latch mechanism, Fig. 4 is a detail view showing the latch member in an inoperative position.

In the drawings: 10 designates a handle which is supported with a suitable grip 11, its extreme end portion having secured thereto the engaging hook 12 which is adapted to engage the branch of a tree which is to be cut.

14 designates the sliding cutting member which is provided with a knife 15 which is so positioned as to sever the branch which is being held within the hook 12. This rod is provided at its other end with a hook 16 which is adapted to hold the rod member toward the handle against the tension of a spring 17, said spring engaging said rod member, one of its ends being held by a yoke which straddles the rod member and which is secured to the handle 10, said spring lying in a groove formed in the handle. The handle is provided with a reduced portion 18 which has connected therewith a transversely arranged pin 19, as shown in Fig. 4. A pivoted latch member 19' is positioned on the lower portion of said rod between collars 20 and 20', said latch member being held in its operative position by a leaf spring 21 which is secured to the handle. The latch member is adapted to slide on a plate 22 which is provided near one end with a beveled projection 23 over which said latch member rides as the same is forced downward against the tension of the spring 17, thus holding the rod in the position shown in Fig. 1. In order to release the latch member to allow the cutting member to engage a branch, a trigger 24 is provided, said trigger being supported on said handle and provided with the off-set portion 25 which forces the latch from behind the stop 23, thus allowing the spring to force the cutting rod to the position shown in Fig. 2. The trigger 24 is pivoted in the reduced portion 25' formed on the handle, the movement of said trigger being limited by stops 25" and 25"'.

In order that the device may be used independent of the trigger mechanism, the latch member may be swung upon its pivot as shown in Fig. 4, said member resting upon the leaf spring 21 allowing the device to be manipulated to sever the branches by simply reciprocating the cutting rod by means of the hook 16.

The many advantages of a construction of this sort will be clearly apparent as the same will be efficient in practice, and economical to manufacture.

Particular attention is called to the latch mechanism which allows the device to be manipulated through the medium of the hook 16 or the trigger 25. Attention is also called to the peculiar positioning of the rod member which assures a perfect thrust when the device is released by the trigger. It will also be noted that the cutting blade may be readily removed in order that the same may be sharpened. It will be seen that the entire structure is one which may be readily manipulated by one hand of the operator.

What is claimed is:

1. A pruning implement, comprising a handle, a hooked member secured to one end of the handle, a rod slidably supported upon the handle, a spring for forcing the rod outward toward the hooked member, the outer end of the rod being provided with a knife, means for shifting the rod against the force of its spring, a beveled stop secured to the handle, a spring pressed catch member rotatably mounted on the rod for engaging the beveled abutment, and a trigger pivoted to the handle for forcing the catch member out of engagement with the abutment.

2. A tree trimming implement, comprising a handle, a rod slidably engaged on the handle and bearing a knife blade, a spring for extending the rod, a hooked portion rising from the rear of the rod for moving the same against the tension of its spring, a catch member rotatably mounted upon the rod, a beveled abutment carried by the handle for engaging the catch member to hold the rod rearwardly against the tension of its spring, a leaf spring secured to the handle at one end and having its intermediate portion adapted to bear against the catch member to hold the same downward toward the abutment, and a trigger pivoted to the handle and having a cam portion adapted to engage the catch and force the same upward above the abutment to release the rod and allow the spring to force the same forward.

In testimony whereof I affix my signature, in the presence of two witnesses.

GEORGE A. STRONG.

Witnesses:
S. S. DILLAW,
E. W. LOVELL.

Copies of this patent may be obtained for five cents each, by addressing the "Commissioner of Patents, Washington, D. C."